No. 654,934. Patented July 31, 1900.
H. BARK.
ATTACHMENT FOR FEED BAGS.
(Application filed Dec. 1, 1899.)
(No Model.)
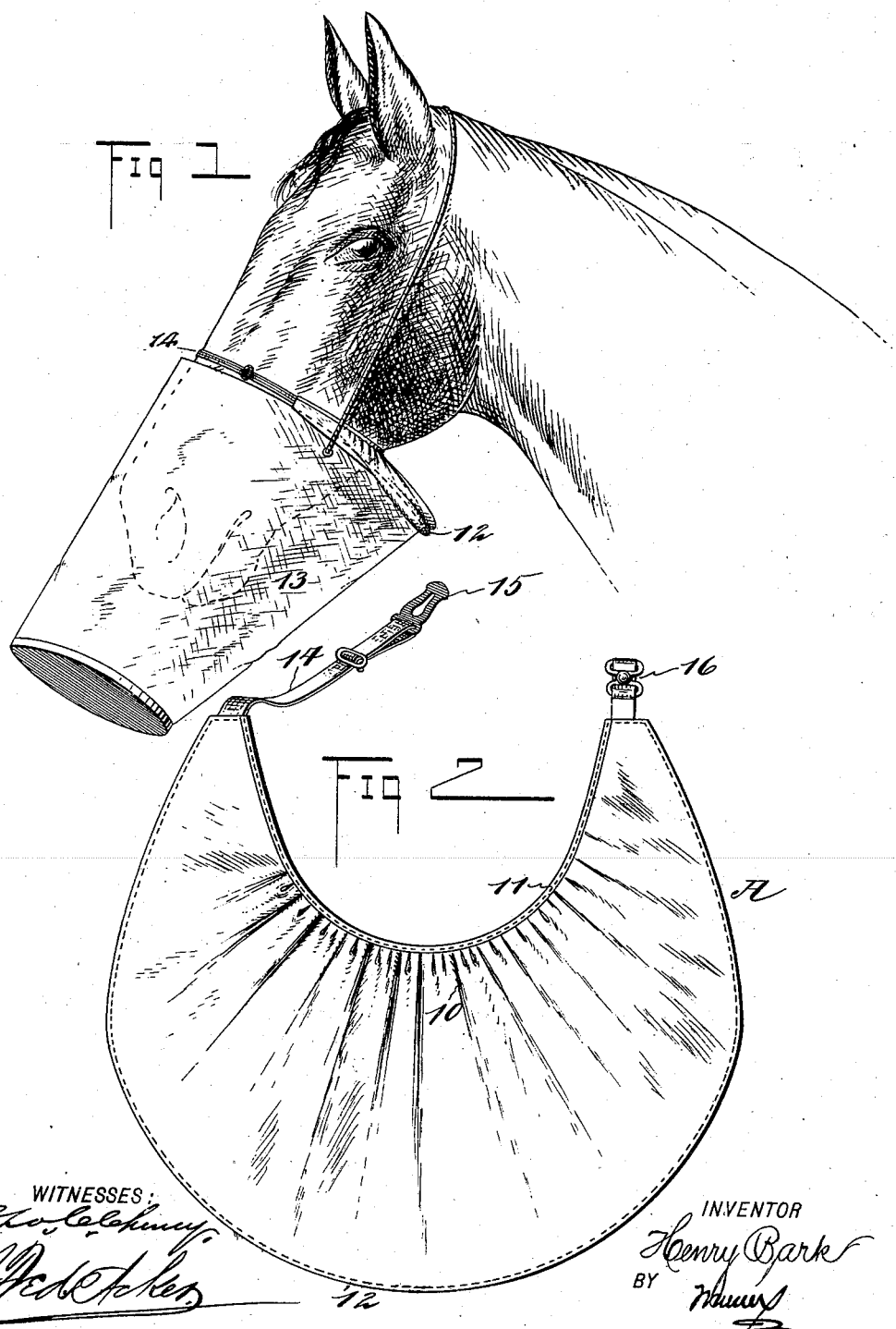

UNITED STATES PATENT OFFICE.

HENRY BARK, OF YONKERS, NEW YORK.

ATTACHMENT FOR FEED-BAGS.

SPECIFICATION forming part of Letters Patent No. 654,934, dated July 31, 1900.

Application filed December 1, 1899. Serial No. 738,795. (No model.)

*To all whom it may concern:*

Be it known that I, HENRY BARK, a citizen of the United States, residing at Yonkers, in the county of Westchester and State of New York, have invented a new and Improved Attachment for Feed-Bags, of which the following is a full, clear, and exact description.

The object of my invention is to provide a grain-guard for feed-bags capable of being applied to any form of bag and which will effectually prevent grain from being spilled from a feed-bag when a horse using the bag tosses his head.

A further object of the invention is to so construct the grain-guard that it may be worn with comfort and without interfering with the circulation of air in the bag to which it is applied.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the head of a horse and a feed-bag having the improvement applied and worn upon the head, and Fig. 2 is a plan view of the grain-guard detached from the feed-bag.

The grain-guard consists of a body A, made of canvas or a like material, and said body is approximately of crescent shape, and at the inner edge of the body gathers 10 are produced, attached to an inner band 11. The outer edge of the body A is plain and full, as shown at 12 in the drawings, so that the major portion of this outer edge 12 may be secured in any suitable or approved manner to the inner or throat portion of the feed-bag 13, the band 11 of the grain-guard being adapted to engage with the rear portion of the head and a portion of the sides. The grain-guard does not extend to the front of the animal's head or to the front of the feed-bag; but one upper end of the grain-guard is provided with a strap 14, preferably elastic, which strap carries a fastening or locking device 15, adapted for engagement with a keeper 16, secured to the opposing upper end of the said grain-guard, as is illustrated in Fig. 2. In Fig. 2 I have illustrated the locking device 15 as in the nature of a link and the keeper in the nature of a stud adapted to enter the link; but it will be understood that any approved form of fastening device may be employed.

When the feed-bag is placed in position upon the head of an animal, as shown in Fig. 1, and the improved grain-guard is attached thereto, the strap 14 is carried over the front and sides of the head and made to connect the two ends of the guard, thus permitting a free circulation of air in the bag and leaving the head of the horse free to be moved as the animal may desire; but when the animal tosses his head, as a horse frequently does when feeding, the grain in falling to the rear will in its tendency to escape from the feed-bag engage with the grain-guard attached to the bag and said guard will effectually prevent the grain from leaving the bag. Thus the animal may have freedom in feeding and there will be no waste of the material supplied to it.

Having thus described my invention, I claim as new and desire to secure by Letters Patent—

1. As a new article of manufacture, a grain-guard for feed-bags, consisting of a crescent-shaped body independent of the feed-bag and having at its outer edge means for attachment to the same, and fastening devices arranged to connect the ends of the body, as set forth.

2. As a new article of manufacture, a grain-guard for feed-bags, consisting of a piece of fabric gathered at its inner edge to make it of crescent shape, the said edge being provided with a band and the outer edge being plain and full, and an elastic detachable connection between the ends of the fabric, as set forth.

3. The combination, with a feed-bag, of a grain-guard consisting of a piece of fabric gathered to a crescent shape at its inner edge and bound at said inner edge, the main portion of the outer edge of the body being detachably secured to the rear portion of a feed-bag at the top, and a strap connection between the ends of said body, said strap connection being adapted to extend over the mouth of the feed-bag at the front and at a portion of its sides.

In testimony whereof I have signed my name to this specification in the presence of two subscribing witnesses.

HENRY BARK.

Witnesses:
J. FRED ACKER,
JNO. M. RITTER.